US011458523B2

(12) United States Patent
Rist (10) Patent No.: US 11,458,523 B2
(45) Date of Patent: Oct. 4, 2022

(54) PLUG ASSEMBLY FOR USE IN A VEHICLE (71) Applicant: Henn GmbH & Co KG., Dornbirn (AT)

(72) Inventor: Marvin Rist, Kennelbach (AT)

(73) Assignee: Henn GmbH & Co KG., Dornbirn (AT)

(*) Notice: Subject to any disclaimer, the term of this patent is extended or adjusted under 35 U.S.C. 154(b) by 634 days.

(21) Appl. No.: 16/483,132

(22) PCT Filed: Feb. 12, 2018

(86) PCT No.: PCT/AT2018/060041
§ 371 (c)(1),
(2) Date: Aug. 2, 2019

(87) PCT Pub. No.: WO2018/145139
PCT Pub. Date: Aug. 16, 2018

(65) Prior Publication Data
US 2020/0240567 A1    Jul. 30, 2020

(30) Foreign Application Priority Data

Feb. 13, 2017  (AT) .............................. A 50115/2017

(51) Int. Cl.
F16L 55/11      (2006.01)
B21D 39/04     (2006.01)
(Continued)

(52) U.S. Cl.
CPC ..... B21D 39/046 (2013.01); F02M 35/10137 (2013.01); F02M 35/10144 (2013.01);
(Continued)

(58) Field of Classification Search
CPC ..... F16L 55/11; F16L 13/147; F16L 37/0885; B21D 39/046
(Continued)

(56) References Cited

U.S. PATENT DOCUMENTS 4,388,752 A * 6/1983 Vinciguerra ......... B21D 39/203
                                                        29/523
4,593,448 A * 6/1986 Ferrari Aggradi .... F16L 13/147
                                                        29/523
(Continued)

FOREIGN PATENT DOCUMENTS

AT    509 196 B1    7/2011
AT    516 939 A4   10/2016
(Continued)

OTHER PUBLICATIONS

International Search Report in PCT/AT2018/060041, dated Jun. 5, 2018.

Primary Examiner — Patrick F Brinson
(74) Attorney, Agent, or Firm — Collard & Roe, P.C.

(57) ABSTRACT

The invention relates to a plug assembly (1), in particular for use in a vehicle, comprising a tube (3), a sealing element (5) and a plug connector (4), which comprises a connector body (6), wherein the connector body (6) has an annulus (22) located between a first casing section (12) and a second casing section (15) of the plug connector (4), wherein a connection section (33) of the tube (3) is introduced into the annulus (22) of the connector body (6) and the sealing element (5) is arranged between the first casing section (12) and the connection section (33) of the tube (3). The first casing section (12) of the connector body (6) is deformed in such a way that an interlocking connection is established between a shaping region (56) of the first casing section (12) of the connector body (6) and the tube (3), wherein the sealing element (5) protrudes at least partially into the shaping region (56) of the first casing section (12), such that the sealing element (5) is clamped at least sectionally between the first casing section (12) and the tube (3).

14 Claims, 5 Drawing Sheets (51) Int. Cl.
*F16L 37/088* (2006.01)
*F02M 35/10* (2006.01)
*F16L 13/14* (2006.01)

(52) U.S. Cl.
CPC ..... *F02M 35/10157* (2013.01); *F16L 13/147* (2013.01); *F16L 37/0885* (2019.08); *F16L 55/11* (2013.01)

(58) Field of Classification Search
USPC .................................. 138/89, 109; 285/256
See application file for complete search history.

(56) References Cited

U.S. PATENT DOCUMENTS

| | | |
|---|---|---|
| 5,148,836 A | 9/1992 | Lawrence |
| 5,829,795 A | 11/1998 | Riesselmann |
| 6,086,044 A | 7/2000 | Guest |
| 7,434,847 B2 | 10/2008 | Densel et al. |
| 7,562,910 B2 * | 7/2009 | Kertesz ............... F16L 33/2073 285/305 |
| 2008/0315576 A1 | 12/2008 | Moretti et al. |
| 2009/0072531 A1 * | 3/2009 | Kertesz ................. F16L 33/227 403/301 |
| 2017/0146159 A1 * | 5/2017 | Hartmann ............. F16L 13/147 |
| 2018/0299050 A1 | 10/2018 | Baldreich et al. |

FOREIGN PATENT DOCUMENTS

| | | |
|---|---|---|
| CN | 85104774 A | 12/1986 |
| CN | 201982829 U | 9/2011 |
| DE | 4022722 A1 | 1/1992 |
| DE | 29622009 U1 | 2/1997 |
| EP | 3 106 242 A1 | 12/2016 |
| JP | 200697879 A | 4/2006 |
| JP | 2007513306 A | 5/2007 |
| RU | 2008 146 417 A | 6/2010 |
| WO | 2015/161333 A1 | 10/2015 |

* cited by examiner

PLUG ASSEMBLY FOR USE IN A VEHICLE

CROSS REFERENCE TO RELATED APPLICATIONS

This application is the National Stage of PCT/AT2018/060041 filed on Feb. 12, 2018, which claims priority under 35 U.S.C. § 119 of Austrian Application No. A 50115/2017 filed on Feb. 13, 2017, the disclosure of which is incorporated by reference. The international application under PCT article 21(2) was not published in English.

The invention relates to a plug assembly, in particular for use in a vehicle.

From WO 2015/161333 A1, a connector assembly is known, in which a first exterior section is deformed in a first region so as to establish an interlocking connection with a pipe, and is deformed in a second region so as to clamp a sealing element between the first exterior section and the pipe.

Such a connector assembly and/or the method for producing such a connector assembly has the disadvantage that the first exterior section must be pressed at two positions axially spaced from one another and that thus an increased deformative power is required.

Further plug assemblies are known from U.S. Pat. No. 5,148,836 A, AT 509 196 B1 and AT 516 939 A4.

It was the object of the present invention to overcome the shortcomings of the prior art and to provide a plug assembly that can easily be produced and nevertheless has a good seal effect and a high mechanical stability, as well as to indicate a method for producing the plug assembly.

This object is achieved by means of a device and a method according to the claims.

According to the invention, a plug assembly, in particular for use in a vehicle, is provided. The plug assembly comprises a tube, a sealing element and a plug connector, which comprises a connector body, wherein the connector body comprises an annulus located between a sleeve-shaped first casing section annularly surrounding a central longitudinal axis of the plug connector in cross section and a sleeve-shaped second casing section of the plug connector annularly surrounding the central longitudinal axis, wherein the first casing section is surrounded by the second casing section and the first casing section of the connector body is connected to the second casing section on a first end section by a first front wall section and the casing sections are open to one another on a second end section, thereby forming a tube receiving side of the connector body, wherein a connection section of the tube is introduced into the annulus of the connector body from the tube receiving side and the sealing element is arranged between the first casing section and the connection section of the tube. The first casing section of the connector body is deformed in such a way that an interlocking connection is established between a shaping region of the first casing section of the connector body and the tube, wherein the sealing element protrudes at least partially into the shaping region of the first casing section, such that the sealing element is clamped at least sectionally between the first casing section and the tube.

The plug assembly according to the invention has the advantage that by the shaping in just a small shaping region of the first casing section, an interlocking clamping of the tube with the connector body can be established and in addition to that the tube can be sealed off with respect to the connector body. Due to the fact that the sealing element partially protrudes into the shaping region of the first casing section, it is ensured that the sealing element is clamped between the first casing section and the tube and can thereby unfold its seal effect.

It can further be useful if the first casing section directly rests on the tube at least sectionally in a contact region, wherein the sealing element is arranged at a distance to the center of the contact region, said distance being selected such that the sealing element is clamped between a first flank of the deformed first casing section adjoining the contact region and the tube, however, does not protrude into a second flank adjoining the contact region and opposing the first flank. The advantage of this is that in the region of the second flank, the first casing section can directly contact the tube without the sealing element being located in between. Due to this direct contact of the stable first casing section with the stable tube, the interlocking connection can have a high stability.

It can further be provided for that in the shaping region, the tube and the first casing section of the connector body are deformed together and the interlocking connection between the connector body and the tube is thereby realized. The advantage of this is that the tube does not have to be previously processed for establishing the interlocking connection but that a standard tube can be used. Owing to the fact that the first casing section and the tube are deformed together, it can also be achieved that the interlocking connection has a high stability.

Moreover, it can be provided for that the tube in the connection section comprises an at least partially circumferential fixing recess into which the first casing section of the connector body protrudes in the deformed state and the interlocking connection between the connector body and the tube is thereby realized. The advantage of this is that a tube with a fixing recess does not obligatorily have to be deformed with the first casing section to allow for the establishment of an interlocking connection between the connector body and the tube. Rather, the fixing recess can serve as a counter-element, into which the first casing section can be deformed.

An embodiment, according to which it may be provided for that the tube is formed from a material having a good plastic deformability, is also advantageous. The advantage of this is that by this measure, the tube can be deformed together with the first casing section.

According to a further embodiment, it is possible that the tube is formed of a steel or a steel alloy. The advantage of this is that steel and/or a steel alloy has a good plastic deformability.

It can further be useful if the sealing element comprises a seal main body, wherein a stop is formed on the outer side of the seal main body. The advantage of this is that the stop on the sealing element can serve the purpose of positioning the tube relative to the sealing element and/or of positioning the tube relative to the connector body.

It can further be provided for that the stop is provided in the form of at least partially circumferential webs. The advantage of this is that such circumferential webs are easy to produce.

It can further be provided for that the second casing section comprises a taper on the tube receiving side, that an inner diameter of the taper is smaller than the inner diameter of the main region of the second casing section and that the tube is deformed in a region in the annulus within the tube receiving side, such that the taper has the effect of an additional interlocking connection between the tube and the connector body. The advantage of this is that by the additional interlocking connection between the connector body and the tube, the axial holding force and/or the stability of the plug assembly can be improved.

The invention further comprises a plug connector with a sealing element inserted therein for use in a plug assembly.

In addition to this a method for producing a plug assembly is provided for, wherein the plug assembly comprises a tube, a sealing element and a plug connector, wherein the plug connector comprises a connector body, wherein the connector body comprises an annulus located between a sleeve-shaped first casing section annularly surrounding a central longitudinal axis of the plug connector in cross section and a sleeve-shaped second casing section of the plug connector annularly surrounding the central longitudinal axis, wherein the first casing section is surrounded by the second casing section and the first casing section of the connector body is connected to the second casing section on a first end section by a first front wall section and the casing sections are open to one another on a second end section, whereby a tube receiving side of the connector body is formed. The method comprises the following method steps:

providing the connector body with the sealing element accommodated in the annulus;
providing the tube;
inserting the tube into the annulus of the connector body from the tube receiving side, wherein the tube is inserted into the annulus such that the sealing element is arranged between the first casing section and the connection section of the tube;
deforming the first casing section of the connector body by means of a pressing tool, wherein the first casing section of the connector body is deformed such that an interlocking connection is established between a shaping region of the first casing section of the connector body and the tube, wherein the sealing element at least partially protrudes into the shaping region of the first casing section, such that the sealing element is clamped at least sectionally between the first casing section and the tube.

The advantage of the method according to the invention is that the first casing section has to be deformed in a shaping region only, which is why the deformation tool can have a less complex shaping and the required deformation forces can, moreover, be reduced.

It can in particular be advantageous if for providing the connector body with the sealing element accommodated in the annulus, the sealing element is slid into the annulus with a stop arranged on the sealing element ahead.

It can further be provided for that the sealing element is inserted into the annulus until it rests on a front wall adjoining the first casing section, wherein the front wall serves as a stop for the sealing element. In this regard, it is of advantage that by this measure, the sealing element can be positioned in the annulus.

It can moreover be provided for that when the tube is inserted into the annulus of the connector body, the tube is inserted into the annulus until the tube comes to rest on the stop of the sealing element. The advantage of this is that thereby, the tube can be positioned relative to the sealing element and/or relative to the connector body.

An embodiment according to which it can be provided for that the tube is pressed against the sealing element with a predetermined force so as to ensure that the sealing element rests on the front wall adjoining the first casing section, is also advantageous. It can thereby be achieved that a possibly wrongly positioned sealing element can be moved into its correct positions by means of the tube.

According to a further embodiment, it is possible that the first casing section of the connector body is deformed merely in the contact region by means of the pressing tool. The advantage of this is that hence, the complexity of the pressing tool can be reduced. In addition to this, by this measure, the required deformation force is kept as low as possible.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
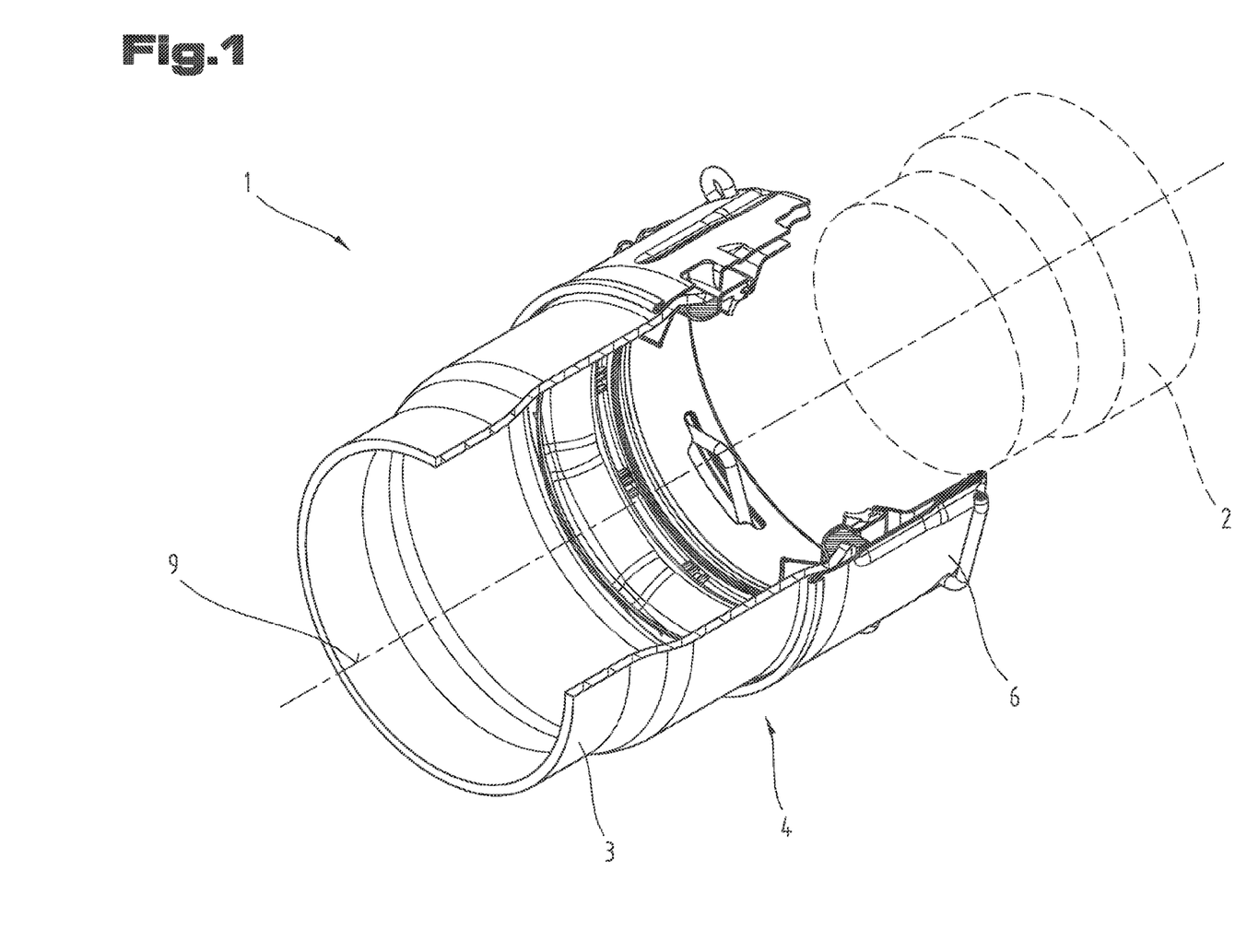
FIG. 1 a perspective representation of a plug assembly in a quarter section.

FIG. 1 shows a perspective view of a plug assembly 1, wherein it is represented in a quarter section. FIG. 1 further schematically represents a mating plug connector 2, which can be connected to the plug assembly 1. The interoperation between the plug assembly 1 and the mating plug connector 2 is sufficiently described in AT 509 196 B1.

In FIG. 1, the plug assembly 1 is shown in an assembled state. The plug assembly 1 comprises a tube 3, a plug connector 4 as well as a sealing element 5 inserted between the plug connector 4 and the tube 3. The plug connector 4 comprises a connector body 6, which is preferably formed as a one-piece deformation part, for example a deep drawing part, in particular of a stainless steel sheet.

Figure 2:
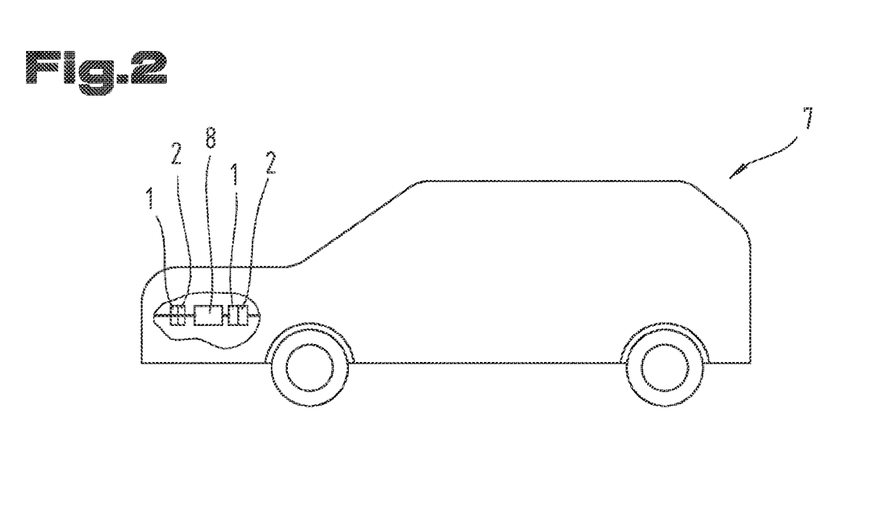
FIG. 2 a vehicle equipped with a plug assembly.

FIG. 2 shows a schematic representation of a vehicle 7 with an inbuilt plug assembly 1 according to FIG. 1. As can be seen from FIG. 2, the plug assembly 1 is preferably used in a vehicle 7, in particular a road-bound power-driven vehicle with a combustion engine. In particular, the plug assembly 1 is used for connecting different components of the fresh air supply means to the combustion engine. It can for example be provided for that the plug assembly 1 with the corresponding mating plug connector 2 is provided for connecting two parts in the intake area of a turbocharger 8. It can further be provided for that such a plug connection is used for connecting two components on the pressure side leaving the turbocharger 8.

Figure 3:
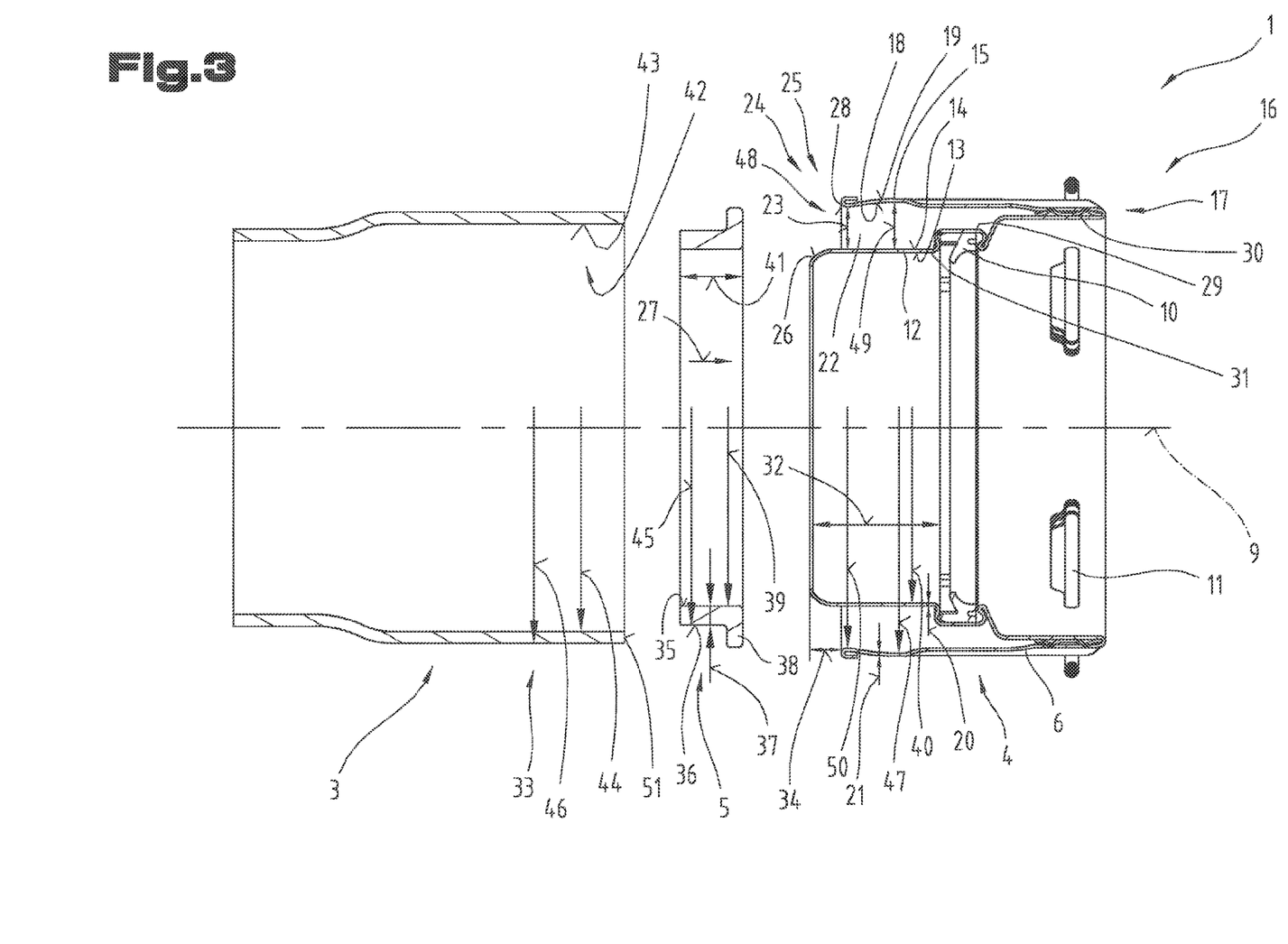
FIG. 3 a sectional representation of a plug assembly in an exploded view.

FIG. 3 shows a longitudinal section through the plug assembly 1 along a central longitudinal axis 9 of the plug connector 4. To facilitate the description of the individual components, these are shown in an exploded view in FIG. 3.

As can be well seen in FIG. 3, besides the connector body 6 the plug connector 4 comprises a plug seal 10, which is accommodated in the connector body 6. The plug seal 10 serves the purpose of sufficiently sealing the plug assembly 1 in the plugged together state with a mating plug connector 2.

The plug connector 4 further comprises a spring element 11 by means of which the plug assembly 1 can be secured in its position relative to the mating plug connector 2 plugged together with the plug assembly 1. The spring element 11 is constructed such that it can easily be activated and deactivated such that the plug assembly 1 and the mating plug connector 2 can be separated from one another and/or connected to one another as needed.

As can be seen from FIG. 3, a first casing section 12, which surrounds the central longitudinal axis 9 of the plug connector 4 in a sleeve-shape, is formed on the connector body 6. In other words, the first casing section 12 is a rotationally symmetrical hollow cylinder.

The first casing section 12 comprises an inner casing face 13 and an outer casing face 14. The first casing section 12 is surrounded by a second casing section 15, which is also formed to be rotationally symmetrical with respect to the central longitudinal axis 9. The first casing section 12 is connected to the second casing section 15 on a first end section 16 by means of a first front wall section 17.

As the first casing section 12, the second casing section 15 also has an inner casing face 18 and an outer casing face 19.

The first casing section 12 is limited by its inner casing face 13 and the outer casing face 14, wherefrom a wall thickness 20 of the first casing section 12 results. The second casing section 15 is also limited by an inner casing face 18 and an outer casing face 19, wherefrom a wall thickness 21 of the second casing section 15 results.

An annulus 22 results from the spacing of the two casing sections 12, 15 to one another. The annulus 22 is limited in particular in the radial direction by the outer casing face 14 of the first casing section 12 and by the inner casing face 18 of the second casing section 15. This in particular results in an annular gap 23. This annular gap 23 is preferably selected to be so large that the tube 3 can at least partially be accommodated therein. In the represented exemplary embodiment, the annular gap 23 amounts to between 2 mm and 20 mm, in particular between 3 mm and 10 mm, preferably between 5 mm and 7 mm.

The two casing sections 12, 15 are open to one another on a second end section 24 of the plug connector 4, wherefrom a tube receiving side 25 of the connector body 6 results.

It can be provided for that the first casing section 12 comprises a chamfer 26, which is formed on the tube receiving side 25 of the first casing section 12. Such a chamfer 26 has the advantage that the sealing element 5 can easily be slid onto the first casing section 12 in the slide-in direction 27. In addition to this, it can also be provided for that the second casing section 15 comprises such a chamfer 28 that the tube 3 can also be slightly slid into the annulus 22.

The chamfers 26, 28 can for example be realized by beadings with corresponding radii and are preferably formed during the deep drawing process.

It can further be provided for that on the first casing section 12 as viewed in the direction of the first end section 16 of the plug connector 4, a seal receptacle 29, which is also formed in the connector body 6, adjoins. In such a seal receptacle 29, a plug seal 10 can be accommodated. It can further be provided for that a third casing section 30, which serves the purpose of accommodating the mating plug connector 2, adjoins the seal receptacle 29. The front wall section 17, which connects the third casing section 30 to the second casing section 15, can adjoin the third casing section 30. By means of this construction and/or correlation, as already mentioned, the first casing section 12 is connected to the second casing section 15 via the front wall section 17.

Preferably, the connector body 6 is produced in a deep drawing procedure, wherein all wall thicknesses of the casing sections of the connector body 6 approximately have the same size.

As can be seen from the representation in FIG. 3, it can also be useful that the seal receptacle 29 comprises a front wall 31, which adjoins the first casing section 12. The front wall 31 can be curved starting out from the first casing section 12 in particular in the direction towards the second casing section 15, wherefrom a receiving depression for the plug seal 10 results.

The formation of the front wall 31 has the further advantage that during assembly the plug assembly 1, the sealing element 5 can be slid into the annulus 22 in slide-in direction 27 until it rests on the front wall 31. Hence, the front wall 31 can also serve the purpose of facilitating the positioning process of the sealing element 5. In other words, the front wall 31 serves as an axial positioning stop for the sealing element 5.

An axial extent 32 of the first casing section 12 is preferably selected to be so large that the annulus 22 has a sufficient length for accommodating the sealing element 5 and a connection section 33 formed on the tube 3.

It can further be provided for that the first casing section 12 extends farther in the direction of the tube receiving side 25 than the second casing section 15 and thus projects with a certain distance 34 in relation to the second casing section 15 as viewed in the axial direction.

The sealing element 5 can also be provided as a rotationally symmetrical body, wherein an essentially rectangular cross section is formed rotationally symmetrical about the central longitudinal axis 9. Hence, an interior casing face 35 and an exterior casing face 36 arranged at a certain distance from one another result on the sealing element 5, wherefrom a wall thickness 37 of the sealing element 5 results. The wall thickness 37 of the sealing element 5 is preferably selected to be so large that the sealing element 5, which preferably consists of a flexible material, can easily be deformed. Preferably, a wall thickness 37 of between 1 mm and 10 mm, in particular between 2 mm and 5 mm is selected, so as to achieve a sealing element 5 that can fulfill its function best possible.

It can further be provided for that the sealing element comprises a stop 38, which protrudes in relation to the exterior casing face 36 of the rectangular cross section and can serve for positioning the tube 3.

An inner diameter 39 of the sealing element 5 is selected to be approximately as large as an outer diameter 40 of the first casing section 12. It is of advantage if the two diameters 39, 40 are coordinated such that the sealing element 5 can be slid onto the first casing section 12 easily and finds good purchase thereon. In the represented exemplary embodiment, the inner diameter 39 of the sealing element 5 amounts to approximately 62 mm.

A width 41 of the sealing element 5 can preferably be selected such that it amounts to approximately between 200% and 500% of the thickness 37 of the sealing element 5. By means of this design of the sealing element 5, it can be achieved that it can best unfold its effect in the inbuilt state in the plug assembly 1.

The tube 3 further comprises a sealing region 42, which cooperates with the sealing element 5 in the assembled state of the plug assembly 1. It can particularly be provided for that in the assembled state of the plug assembly 1, the exterior casing face 36 of the sealing element 5 rests on an interior casing face 43 of the sealing region 42. The detailed mechanisms for sealing between the tube 3 and the connector body 6 will be described in more detail below.

To allow for the tube 3 to be slid over the sealing element 5, it is provided for that an inner diameter 44 of the sealing region 42 is larger than an outer diameter 45 of the sealing element 5. Preferably, the two diameters 44, 45 are selected such that the tube 3 can be easily slid over the sealing element 5 during the assembling process of the plug assembly 1.

An outer diameter 46 of the tube 3 is preferably selected such that it is smaller than an inner diameter 47 of the second casing section 15 of the connector body 6. Hence, the tube 3 can be easily slid into the annulus 22 of the connector body 6 during assembly of the plug assembly 1.

It can further be provided for that the second casing section 15 of the connector body 6 comprises a taper 48 on the tube receiving side 25. By the taper 48, the interlocking connection between the tube 3 and the connector body 6 in the assembled state of the plug assembly 1 can be improved.

Due to the formation of the taper 48, the annular gap 23 on the tube receiving side 25 is smaller than a clear main width 49 of the annulus 22.

It can further be provided for that the taper 48 has a continuously changing cross section and is thus formed conically. A thus formed taper 48 can be easily produced with regard to the aspect of manufacturing. It is moreover conceivable that the taper 48 is provided to be curved. In yet another variant, it is also conceivable that the taper 48 is formed by a stepping.

However, not the shape is decisive for the functionality of the taper 48 but it is solely required that an inner diameter 50 of the taper 48 is smaller than the inner diameter 47 of the main region of the second casing section 15.

The outer diameter 46 of the tube 3 is preferably selected to be so large that it is smaller than the inner diameter 50 of the second casing section 15 in the region of the taper 48. Hence, the tube 3 can be easily slid into the annulus 22 of the connector body 6 during assembly of the plug assembly 1.

Figure 4:
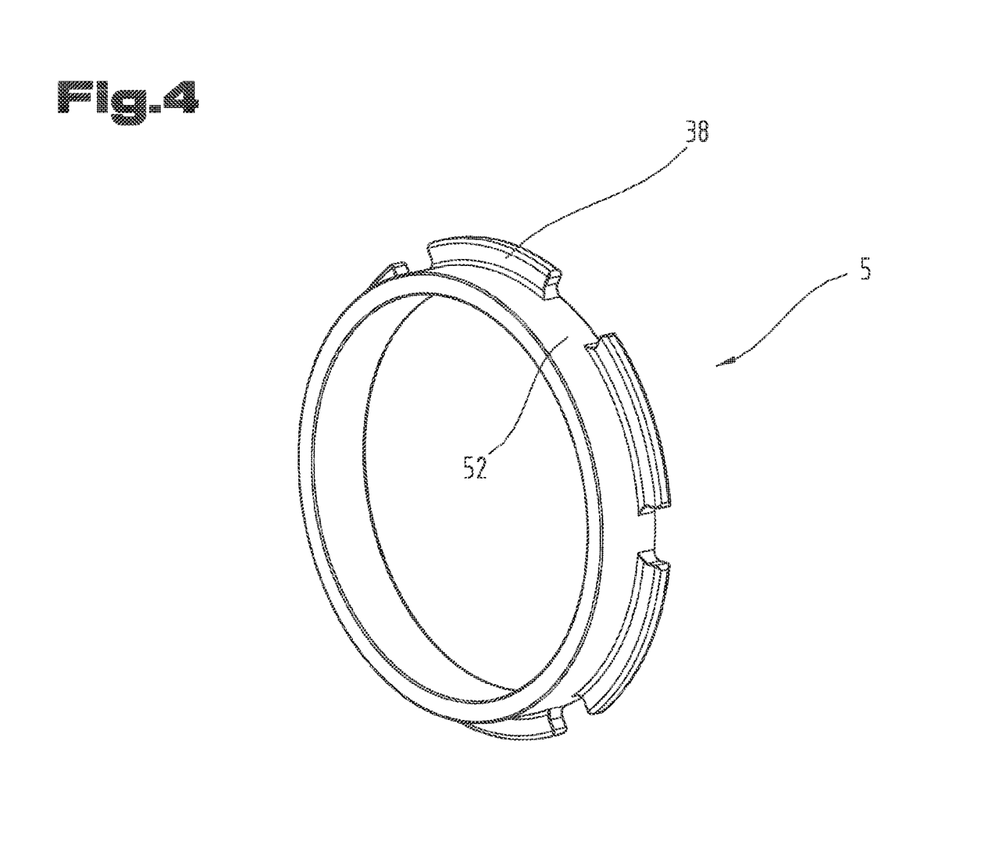
FIG. 4 a perspective view of an exemplary embodiment of a sealing element.

FIG. 4 shows an exemplary embodiment of the sealing element 5 in a perspective view. As can be seen from FIG. 4, it can be provided for that the stop 38 is provided in the form of individual segments, which are arranged distributed on the circumference on a seal main body 52.

An assembly of the plug assembly 1 is described below by means of the representation in FIGS. 5 and 6.

In a first method step, the sealing element 5 is inserted into the annulus 22. In the course of this, the sealing element 5 can be moved in the slide-in direction 27 in the annulus 22 until it rests on the front wall 31 of the seal receptacle 29. It can particularly be provided for that the plug connector 4 with the sealing element 5 inserted therein are provided and/or created in a first plant and are put into interim storage and/or transported to further plants.

In a further method step the correct positioning of the sealing element 5 in the connector body 6 can optionally be checked. Once the sealing element 5 has been positioned correctly in the connector body 6, the tube 3 can now be inserted into the annulus 22 in slide-in direction 27 in a further method step.

Preferably, the tube 3 is slid into the annulus 22 until an end face 51 of the tube 3 rests on the stop 38 of the sealing element 5. Thereby, the axial position of the tube 3 relative to the connector body 6 is determined as well.

Figure 5:
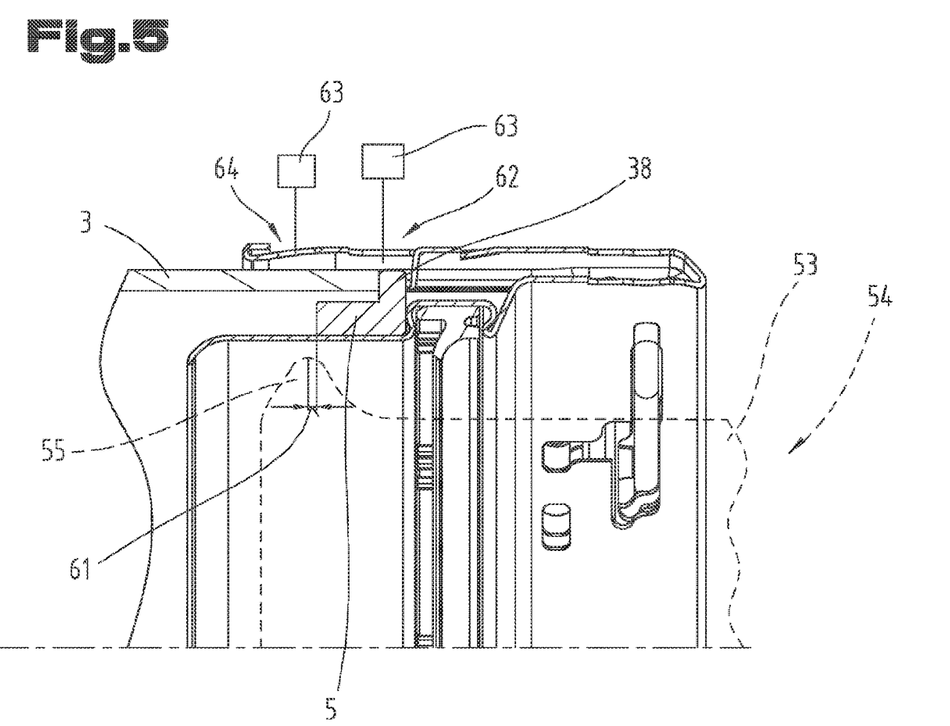
FIG. 5 a sectional representation of the individual components of a first exemplary embodiment of the plug assembly in a plugged together position.

In the depiction according to FIG. 5, the sealing element 5 and the tube 3 are represented in the plugged together position in which they are inserted into the annulus 22 of the connector body 6. In FIG. 5, equal reference numbers and/or component designations are used for equal parts as in FIG. 3. In order to avoid unnecessary repetitions, it is pointed to/reference is made to the detailed description of FIG. 3.

As can be seen from FIG. 5, in the plugged together state of the plug assembly 1, the sealing element 5 rests on the front wall 31 of the seal receptacle 29. Furthermore, the end face 51 of the tube 3 rests on the stop 38 of the sealing element 5. Hence, the position of the sealing element 5 relative to the connector body 6 and the position of the tube 3 relative to the sealing element 5 and relative to the connector body 6 are determined.

So as to be able to fixate the components to one another, it can be provided for that in a further method step for producing the plug assembly 1, the first casing face 12 is pressed such that an interlocking connection is established between the first casing face 12 and the tube 3.

FIG. 5 schematically shows a pressing tool 53 of a pressing machine 54 serving the purpose of deforming the first casing face 12 and thus of establishing an interlocking connection between the connector body 6 and the tube 3. As can be seen from FIG. 5, the pressing tool 53 can comprise a pressing lug 55 serving the purpose of deforming the first casing face 12.

Figure 6:
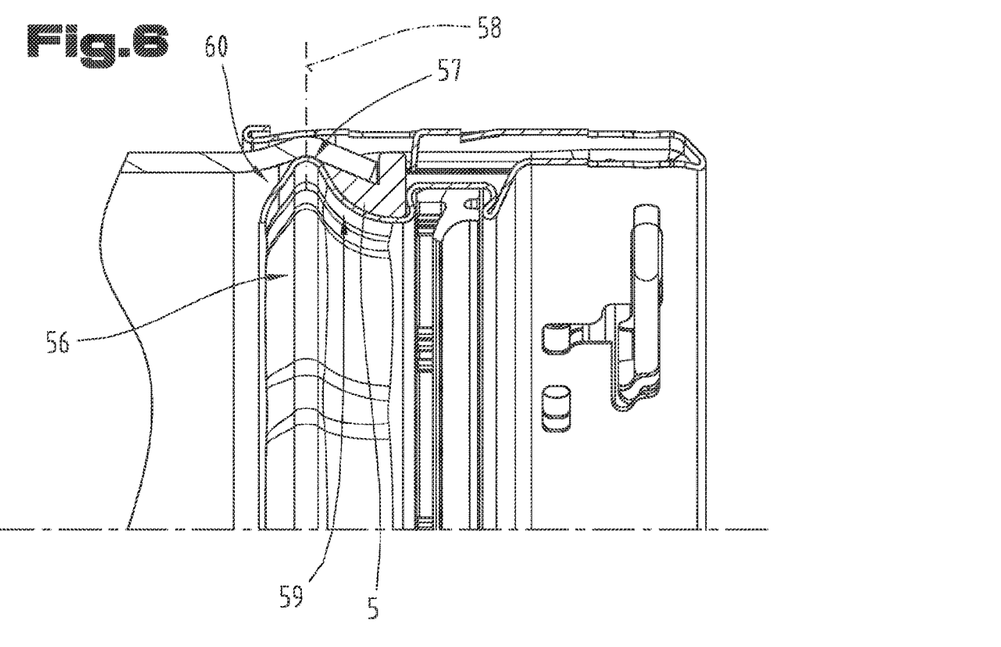
FIG. 6 a sectional representation of the individual components of the first exemplary embodiment of the plug assembly in a pressed position.

FIG. 6 shows a further sectional view of the plug assembly 1 corresponding to the representations in FIGS. 3 and 5. In FIG. 6, equal reference numbers and/or component designations are used for equal parts as in FIGS. 3 and 5 preceding it. In order to avoid unnecessary repetitions, it is pointed to/reference is made to the detailed description of FIGS. 3 and 5 preceding it.

In the sectional view in FIG. 6, the plug assembly 1 is shown in a pressed state. As can be seen from FIG. 6, the first casing section 12 is deformed in a shaping region 56 such that an interlocking connection is established between the first casing section 12 and the tube 3. In the present exemplary embodiment according to FIG. 6, the interlocking connection between the first casing section 12 and the tube 3 is realized in that the first casing section 12 is deformed and/or pressed outwardly by the pressing tool 53 in the shaping region 56 until the first casing section 12 comes to rest on the tube 3 and the tube 3 is also deformed in the shaping region 56. The tube 3 can be deformed outwardly until it rests on the second casing section 15. In other words, the tube 3 can be clamped between the deformed first casing section 12 and the second casing section 15.

In this regard, it is provided for that the sealing element 5 at least partially protrudes into the shaping region 56 of the first casing section 12, such that the sealing element 5 is sectionally clamped between the first casing section 12 and the tube 3.

The shaping region 56 comprises a contact region 57 on which the deformation has a maximum measurement. Thus, the first casing section 12 is deformed furthest towards the second casing section 15 in the center 58 of the contact region 57. Further, a first flank 59 and a second flank 60 are formed, which adjoin the contact region 57. The two flanks 59, 60 form the transition between the contact region 57 and the non-deformed or merely slightly deformed part of the first casing section 12.

First flank 59 refers to that flank which is arranged closer to the first end section 16 of the connector body 6. Second flank 60 refers to that flank which is arranged closer to the second end section 24 of the connector body 6.

As can be gathered from FIG. 6, it can be provided for that the center 58 of the contact region 57 is selected at a position between the taper 48 and the front wall 31 such that the taper 48 effects an additional positive fit between the tube 3 and the second casing section 15.

In the present exemplary embodiment, the shaping region 56 and/or the sealing element 5 are designed such that the sealing element 5 is clamped between the first casing section 12 and the tube 3 in the region of the first flank 59, however, does not protrude into the region of the second flank 60. In this regard, it can particularly be provided for that the sealing element 5 is arranged at a distance 61 to the center 58 of the contact region 57, said distance 61 being selected such that the sealing element 5 is clamped between the first flank 59 of the deformed first casing section 12 adjoining the contact region 57 and the tube 3, however, does not protrude into a second flank 60 adjoining the contact region 57 and opposing the first flank 59.

In a further embodiment variant that is not depicted, it can also be provided for that the sealing element 5 is clamped both between the first flank 59 of the deformed first casing section 12 and the tube 3 and between the second flank 60 of the deformed first casing section 12 and the tube 3.

In particular, the interior casing face 35 of the sealing element 5 is pressed against the outer casing face 14 of the first casing section 12 such that these adjoin each other closely. Furthermore, the exterior casing face 36 of the sealing element 5 is pressed against the interior casing face 43 of the seal receptacle 42 in the tube 3 such that these faces also adjoin each other closely. By this clamping of the sealing element 5, it is achieved that the tube 3 can be sufficiently sealed off with respect to the plug connector 4 so as to prevent leakage of a pressurized gas.

As can further be gathered from FIG. 5, it can be provided for that a first window opening 62, through which the correct positioning of the sealing element 5 can be checked by means of a measuring device 63, is formed in the second casing section 15. Furthermore, a second window opening 64 can be provided, through which the deformation degree of the tube 3 can be checked by means of a measuring device 63. The measuring device 63 for checking the correct positioning of the sealing element 5 and the measuring device 63 for checking the deformation degree of the tube 3 can be provided in the form of different devices. However, it can also be provided for that the same measuring device 63 is used for both method steps.

Figure 7:
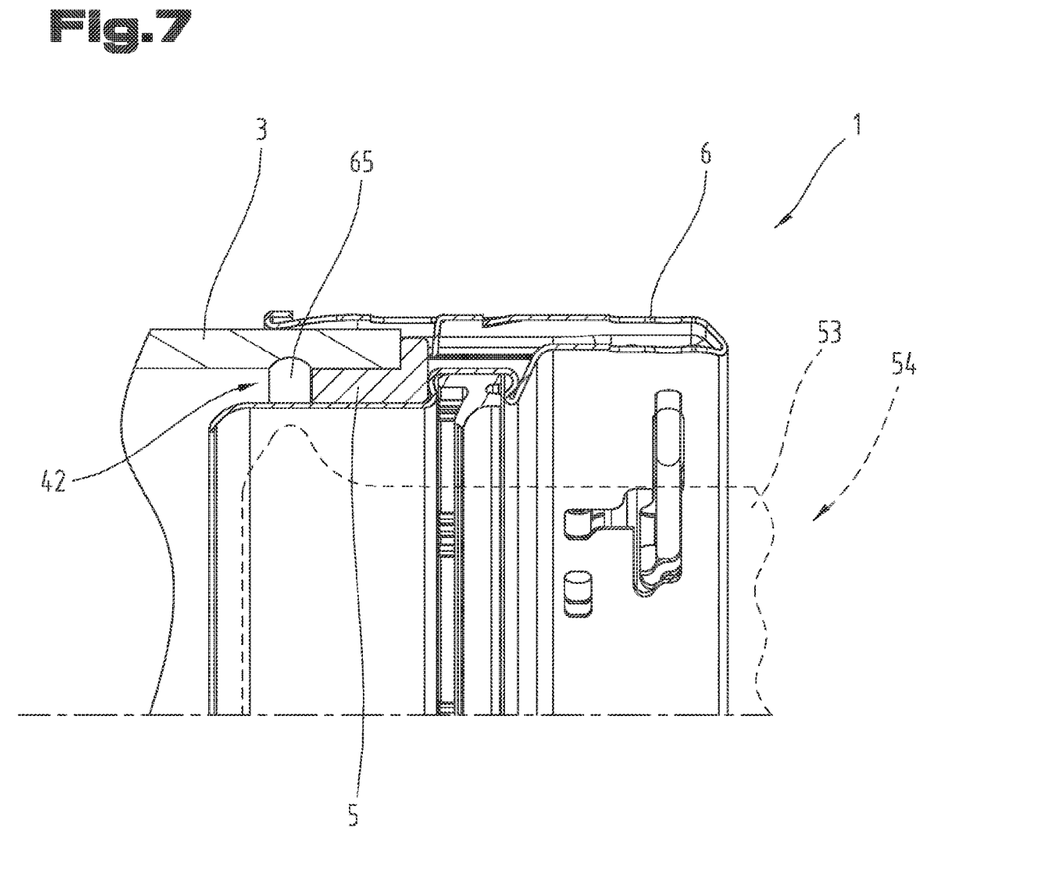
FIG. 7 a sectional representation of the individual components of a second exemplary embodiment of the plug assembly in a plugged together position.

FIG. 7 shows a further and possibly independent embodiment of the plug assembly 1, wherein again, equal reference numbers and/or component designations are used for equal parts as in FIGS. 1 through 6 above. In order to avoid unnecessary repetitions, it is pointed to/reference is made to the detailed description in FIGS. 1 through 6 preceding it.

As can be seen from FIG. 7, it can be provided for that the connection section 33 of the tube 3 comprises a fixing recess 65 in the sealing region 42.

With such a design of the tube 3, the first casing section 12 can be deformed into the fixing recess 65 so as to establish the interlocking connection. The tube 3 can hence be held in the connector body 6 due to the fact that the shaping region 56 of the first casing section 12 corresponds to the fixing recess 65 of the tube 3.

In such an embodiment variant, the tube 3 does not obligatorily have to be designed to be deformable, as no deformation of the tube 3 is required for establishing the positive fit. The tube 3 can for example be made from a plastic material, which does not have good plastic deformation properties.

The fixing recess 65 is preferably formed as a groove semicircular in cross section that is inserted into the sealing region 42 of the tube 3. According to a first embodiment variant, it can be provided for that the groove is formed as a circumferential groove.

According to a further embodiment variant, it can be provided for that the fixing recess 65 is segmented as viewed across the circumference and thus comprises intermediate webs interrupting the fixing recess 65.

In a further embodiment variant, the tube 3 can comprise the fixing recess 65 and additionally be plastically deformable.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| | |
|---|---|
| 1 | plug assembly |
| 2 | mating plug connector |
| 3 | tube |
| 4 | plug connector |
| 5 | sealing element |
| 6 | connector body |
| 7 | vehicle |
| 8 | turbocharger |
| 9 | longitudinal axis of the plug connector |
| 10 | plug seal |
| 11 | spring element |
| 12 | first casing section |
| 13 | inner casing face |
| 14 | outer casing face |
| 15 | second casing section |
| 16 | first end section plug connector |

-continued

| | |
|---|---|
| 17 | front wall section |
| 18 | inner casing face |
| 19 | outer casing face |
| 20 | wall thickness of first casing section |
| 21 | wall thickness of second casing section |
| 22 | annulus |
| 23 | annular gap |
| 24 | second end section of plug connector |
| 25 | tube receiving side |
| 26 | chamfer |
| 27 | slide-in direction |
| 28 | chamfer |
| 29 | seal receptacle of plug connector |
| 30 | third casing section |
| 31 | front wall of seal receptacle |
| 32 | axial extent of first casing section |
| 33 | connection section |
| 34 | distance |
| 35 | interior casing face of sealing element |
| 36 | exterior casing face of sealing element |
| 37 | wall thickness of sealing element |
| 38 | stop |
| 39 | inner diameter of sealing element |
| 40 | outer diameter of first casing section |
| 41 | width of sealing element |
| 42 | sealing region of tube |
| 43 | interior casing face of seal receptacle |
| 44 | inner diameter of seal receptacle |
| 45 | outer diameter of sealing element |
| 46 | outer diameter of tube |
| 47 | inner diameter second casing section |
| 48 | taper |
| 49 | main width of annulus |
| 50 | inner diameter taper |
| 51 | end face of tube |
| 52 | seal main body |
| 53 | pressing tool |
| 54 | pressing machine |
| 55 | pressing lug |
| 56 | shaping region |
| 57 | contact region |
| 58 | center |
| 59 | first flank |
| 60 | second flank |
| 61 | distance |
| 62 | first window opening |
| 63 | measuring device |
| 64 | second window opening |
| 65 | fixing recess |

The invention claimed is:

1. A plug assembly, in particular for use in a vehicle, comprising a tube, a sealing element and a plug connector, which comprises a connector body,
wherein the connector body comprises an annulus located between a sleeve-shaped first casing section annularly surrounding a central longitudinal axis of the plug connector in cross section and a sleeve-shaped second casing section of the plug connector annularly surrounding the central longitudinal axis,
wherein the first casing section is surrounded by the second casing section and the first casing section of the connector body is connected to the second casing section on a first end section by a first front wall section and the casing sections are open to one another on a second end section, thereby forming a tube receiving side of the connector body,
wherein a connection section of the tube is introduced into the annulus of the connector body from the tube receiving side and the sealing element is arranged between the first casing section and the connection section of the tube,
wherein the first casing section of the connector body is deformed in such a way that an interlocking connection is established between a shaping region of the first casing section of the connector body and the tube,
wherein the sealing element protrudes at least partially into the shaping region of the first casing section, such that the sealing element is clamped at least sectionally between the first casing section and the tube,
wherein the first casing section directly rests on the tube at least sectionally in a contact region,
wherein the first casing section comprises a first flank and a second flank, the first flank beginning at a center of the contact region, extending away from the tube receiving side of the connector body and terminating at an end of the shaping region adjacent the first end section and the second flank beginning at the center of the contact region, extending toward the tube receiving side of the connector body and terminating at an end of the shaping region adjacent the second end section, and
wherein the sealing element is arranged at a distance to the center of the contact region, said distance being selected such that the sealing element is clamped between the first flank of the first casing section and the tube, however, does not protrude into the second flank, such that the sealing element is disposed at least partially within an extent of the first flank.

2. The plug assembly according to claim 1, wherein in the shaping region, the tube and the first casing section of the connector body are deformed together and the interlocking connection between the connector body and the tube is thereby realized.

3. The plug assembly according to claim 1, wherein the tube in the connection section comprises an at least partially circumferential fixing recess into which the first casing section of the connector body protrudes in the deformed state and the interlocking connection between the connector body and the tube is thereby realized.

4. The plug assembly according to claim 1, wherein the tube is formed from a material having a good plastic deformability.

5. The plug assembly according to claim 1, wherein the tube is formed from a metal.

6. The plug assembly according to claim 1, wherein the sealing element comprises a seal main body, wherein a stop is formed on the outer side of the seal main body.

7. The plug assembly according to claim 6, wherein the stop is provided in the form of at least partially circumferential webs.

8. The plug assembly according to claim 1, wherein the second casing section comprises a taper on the tube receiving side, that an inner diameter of the taper is smaller than the inner diameter of the main region of the second casing section and that the tube is deformed in a region in the annulus within the tube receiving side, such that the taper has the effect of an additional interlocking connection between the tube and the connector body.

9. A method for producing a plug assembly, wherein the plug assembly comprises a tube, a sealing element and a plug connector,
wherein the plug connector comprises a connector body,
wherein the connector body comprises an annulus located between a sleeve-shaped first casing section annularly surrounding a central longitudinal axis of the plug connector in cross section and a sleeve-shaped second casing section of the plug connector annularly surrounding the central longitudinal axis,
wherein the first casing section is surrounded by the second casing section and the first casing section of the connector body is connected to the second casing section on a first end section by a first front wall section and the casing sections are open to one another on a second end section, thereby forming a tube receiving side of the connector body, wherein the method comprises the following method steps:

providing the connector body with the sealing element accommodated in the annulus;

providing the tube;

inserting the tube into the annulus of the connector body from the tube receiving side, wherein the tube is inserted into the annulus such that the sealing element is arranged between the first casing section and the connection section of the tube;

deforming the first casing section of the connector body by means of a pressing tool, wherein the first casing section of the connector body is deformed such that an interlocking connection is established between a shaping region of the first casing section of the connector body and the tube, wherein the sealing element at least partially protrudes into the shaping region of the first casing section, such that the sealing element is clamped at least sectionally between the first casing section and the tube, wherein the first casing section is deformed such that the first casing section directly rests on the tube at least sectionally in a contact region, wherein the first casing section comprises a first flank and a second flank, the first flank beginning at a center of the contact region, extending away from the tube receiving side of the connector body and terminating at an end of the shaping region adjacent the first end section and the second flank beginning at the center of the contact region, extending toward the tube receiving side of the connector body and terminating at an end of the shaping region adjacent the second end section, and wherein the sealing element is arranged at a distance to the center of the contact region, said distance being selected such that the sealing element is clamped between the first flank of the first casing section and the tube, however, does not protrude into the second flank, such that the sealing element is disposed at least partially within an extent of the first flank.

10. The method according to claim 9, wherein for providing the connector body with the sealing element accommodated in the annulus, the sealing element is slid into the annulus with a stop arranged on the sealing element ahead.

11. The method according to claim 10, wherein the sealing element is inserted into the annulus until it rests on a front wall adjoining the first casing section, wherein the front wall serves as a stop for the sealing element.

12. The method according to claim 10, wherein when the tube is inserted into the annulus of the connector body, the tube is inserted into the annulus until the tube comes to rest on the stop of the sealing element.

13. The method according to claim 12, wherein the tube is pressed against the sealing element with a predetermined force so as to ensure that the sealing element rests on the front wall adjoining the first casing section.

14. The method according to claim 9, wherein the first casing section of the connector body is deformed merely in the contact region by means of the pressing tool.

* * * * *